(12) United States Patent
Kaethner et al.

(10) Patent No.: US 8,485,288 B2
(45) Date of Patent: Jul. 16, 2013

(54) OSCILLATING UNDERCARRIAGE, IN PARTICULAR FOR A DRILLING DEVICE

(75) Inventors: Ralph Kaethner, Olpe (DE); Albert Clemens, Wenden (DE)

(73) Assignee: Klemm Bohrtechnik GmbH, Drolshagen (DE)

( * ) Notice: Subject to any disclaimer, the term of this patent is extended or adjusted under 35 U.S.C. 154(b) by 955 days.

(21) Appl. No.: 12/007,207

(22) Filed: Jan. 8, 2008

(65) Prior Publication Data
US 2008/0174097 A1 Jul. 24, 2008

(30) Foreign Application Priority Data
Jan. 24, 2007 (EP) .................................... 07001546

(51) Int. Cl.
*B62D 55/116* (2006.01)
(52) U.S. Cl.
CPC .................................. *B62D 55/116* (2013.01)
USPC ........................................ 180/9.52; 180/9.46
(58) Field of Classification Search
USPC .................. 180/9.46, 9.5, 9.52, 9.1
See application file for complete search history.

(56) References Cited

U.S. PATENT DOCUMENTS

| | | | |
|---|---|---|---|
| 3,061,380 A | 10/1962 | Hale | |
| 3,459,439 A | 8/1969 | Sinclair et al. | |
| 3,910,649 A * | 10/1975 | Roskaft | 305/144 |
| 4,046,209 A | 9/1977 | LaCasse | |
| 4,284,150 A | 8/1981 | Davis | |
| 4,341,149 A * | 7/1982 | Dezelan | 91/526 |
| 5,806,616 A | 9/1998 | Enlund et al. | |
| 6,328,173 B1 | 12/2001 | Wimmer | |
| 6,951,103 B2 | 10/2005 | Berthod et al. | |
| 6,962,222 B2 * | 11/2005 | Kirihata | 180/9.46 |
| 7,325,634 B2 * | 2/2008 | Law et al. | 180/9.52 |
| 7,584,812 B2 * | 9/2009 | Radke et al. | 180/9.54 |
| 2002/0001516 A1 * | 1/2002 | Cook et al. | 414/685 |

FOREIGN PATENT DOCUMENTS

| | | |
|---|---|---|
| EP | 0332883 | 9/1989 |
| EP | 0367889 | 5/1990 |
| EP | 0985629 | 3/2000 |
| EP | 1375926 | 1/2004 |

* cited by examiner

*Primary Examiner* — Paul N Dickson
*Assistant Examiner* — Maurice Williams
(74) *Attorney, Agent, or Firm* — Jacobson Holman PLLC

(57) ABSTRACT

A drilling device, comprising a chassis, two undercarriage units which are arranged laterally on the chassis and supported in a pivotable manner, two oscillating cylinders for pivoting the undercarriage units relative to the chassis, with an oscillating cylinder being assigned to each undercarriage unit, and hydraulic lines which are arranged on the oscillating cylinders for actuation of the oscillating cylinders, wherein the hydraulic lines of the two oscillating cylinders are connected to one another in order to pivot the undercarriage units in opposite directions. A safety device to be provided for line breakage safety on at least one hydraulic line for each oscillating cylinder, with each safety device having at least one remote-controlled stop valve for blocking the respective hydraulic line in the case of line breakage, and in that a remote-control device is provided for simultaneously opening the stop valves during normal operation.

16 Claims, 4 Drawing Sheets

OSCILLATING UNDERCARRIAGE, IN PARTICULAR FOR A DRILLING DEVICE

BACKGROUND OF THE INVENTION

1. Field of the Invention

The invention relates to an oscillating undercarriage for a drilling device. An oscillating undercarriage of such type has a chassis, two undercarriage units which are arranged laterally on the chassis and supported in a pivotable manner, two oscillating cylinders for pivoting the undercarriage units relative to the chassis, with an oscillating cylinder being assigned to each undercarriage unit, and hydraulic lines which are arranged on the oscillating cylinders for actuation of the oscillating cylinders, wherein the hydraulic lines are connected to one another for pivoting the undercarriage units in opposite directions.

2. Description of Related Art Including Information Disclosed Under 37 CFR §§1.97 and 37 CFR 1.98

Drilling devices used in specialist foundation construction, in quarry and/or mining are frequently required to operate on uneven ground and/or construction sites that have a low load-bearing capacity. To improve their cross-country mobility and climbing capacity these drilling devices are in most cases equipped with crawler-type undercarriages.

To further improve the cross-country mobility and/or to minimize punctiform highly surface pressures and therefore to reduce the risk of soil failure undercarriages are known, in which the two undercarriage units containing the crawler tracks are not connected in a rigid manner to each other but are able to make a nodding movement independently of each other about an axis extending horizontally and transversely to the driving direction of the undercarriage units. To this end the undercarriage units are pivotably supported about the axis on the chassis and, located at a certain distance to the axis, they have a respective point of articulation for a hydraulic cylinder, the cylinder being in turn articulated to the chassis on the side facing away from the undercarriage unit. In such an arrangement the operating forces and torques are transmitted in the form of a force couple from the chassis to the undercarriage units. Through an extension or shortening of a hydraulic cylinder the respective undercarriage unit can be brought into different angular positions with respect to the chassis.

The nodding movement resulting from the pivoting of the undercarriage units is most often referred to by the term "oscillation". Accordingly, the corresponding undercarriage is referred to as the oscillating undercarriage, the axis about which a pivoting takes place is referred to as the oscillation axis and the hydraulic cylinders provided for generating the movement are referred to as the oscillating cylinders.

A crawler-mounted drill vehicle having an oscillating undercarriage is known for example from EP 0 332 883 A1.

As a rule, the two oscillating cylinders are connected to each other in such a manner that both the two piston-head chambers and the two ring surface chambers of the two oscillating cylinders are each connected to one another hydraulically. If, in such an arrangement, different surface pressures occur on the undercarriage units during driving on uneven ground, an automatic pressure balancing takes place in the respective mutually communicating cylinder chambers during movement of the undercarriage units. The resultant opposed movement is referred to as "passive" oscillation or "oscillation automatic".

To broaden the functions of the oscillating undercarriage a conveyor device can be provided, by means of which two mutually connected chambers can be supplied simultaneously from the outside with oil, whereas in the chambers lying opposite oil is discharged. If piston surfaces of different dimensions are present on both sides of the cylinder pistons, the system is supplied as a whole with oil or oil is discharged from the system. In this, the movement carried out by the undercarriage is referred to as "active" oscillation. In the case of active oscillation the oscillating cylinders are operated in the same direction so that the chassis can be lowered or raised with regard to the two undercarriage units. This can be of particular advantage in loading operations and/or when driving on steep construction site ramps.

If, in the exceptional case, damage occurs at an oscillating undercarriage on the hydraulic lines, which can be ascribed for example to an external influence occurring during rough drilling operation, a sudden draining of the oscillating cylinders can take place which is accompanied by a sudden tilting of the entire chassis and, if applicable, together with a drill mast arranged thereon. Due to the potential danger involved here a state as such is to be avoided.

It is known to make use of ball valves in the supply lines of the oscillating cylinders. However, more often than not these valves cannot be closed quickly enough during driving when line breakage occurs, for which reason they cannot be employed for line breakage safety.

Furthermore, so-called hose or pipe breakage safety devices are known which, on being flow-activated, take effect on reaching a critical flow rate. However, such safety devices operate in a comparatively viscosity-dependent manner, i.e. in a temperature-dependent way, and under certain circumstances they can only take effect with an intolerable delay, so that these safety devices can at best be employed to a limited degree for the purpose of protecting an oscillating undercarriage against line breakage.

Moreover, during the movement of an oscillating undercarriage on terrain it is possible that in the exceptional case of a drilling device having an extreme off-center position of its centre of gravity, e.g. due to a drill mast positioned extremely off-center, the passive oscillating movement can lead to an even more unfavourable displacement of the center of gravity, which can in turn increase the surface pressure and accelerate the oscillating process. Hence, in the exceptional case the system can become unstable which in the extreme might lead to an overturning of the device.

In the connecting lines for the oscillating cylinders the provision of unblockable check valves is known, to which pressure is applied automatically during driving of the drilling device, which annuls the unblocking and permits an oscillation of the undercarriage units. Though, when the device is stationary the oscillation is prevented. However, with such a device an overturning during driving cannot be prevented without any means.

BRIEF SUMMARY OF THE INVENTION

The object of the invention is to provide an oscillating undercarriage which, while being of an especially high economic efficiency and reliability, possesses a particularly high operational safety.

The oscillating undercarriage according to the invention is characterized in that on at least one hydraulic line for each oscillating cylinder a safety device for line breakage safety is provided, with each safety device having at least one remote-controlled stop valve for blocking the respective hydraulic line in the case of line breakage, and in that a remote-control device is provided for opening the stop valves simultaneously during normal operation.

A fundamental idea of the invention can be seen in the fact that at least one stop valve is arranged on each of the hydraulic lines in the area of the two hydraulic cylinders. By means of these stop valves the respective hydraulic line can be blocked in the case of line breakage and therefore prevention can be made of the assigned oscillating cylinder draining abruptly via the broken hydraulic line. Furthermore, by closing the stop valves an excessive and/or unstable oscillating movement of the undercarriage can be avoided. Hence, the risk of the undercarriage being overturned can be counteracted efficiently.

In accordance with the invention the stop valves can be actuated by means of a remote-control device. As a result, it is possible to close the valves in an especially quick way in the case of emergency, whereby an uncontrolled oscillating movement can be already counteracted at an early point in time so that the operational safety is increased further. There, the remote-control device is provided for opening the stop valves simultaneously during normal operation, i.e. when neither a line breakage nor an unstable oscillating movement occurs in particular. This permits a particularly economic operation, since the stop valves, that are possibly arranged at inaccessible parts, can be opened easily and quickly in normal day-to-day operation. Basically, the remote-control device can be provided to block the stop valves individually. However, an especially reliable operation is given in that the remote-control device is provided for closing all stop valves simultaneously in case of interference, especially in the case of line breakage. With such an arrangement the oscillating undercarriage can also be securely fixed if the cause of interference is as yet unknown. Through the safety devices according to the invention especially reliable load-holding means are provided for the oscillating cylinders, which are suitably arranged in close proximity to the oscillating cylinders.

The undercarriage in accordance with the invention is preferably provided for a drilling device. In this case a drill mast element, on which a drilling device is provided in particular, can be arranged on the chassis, which can also be referred to as the upper carriage. The undercarriage according to the invention can be a crawler-type undercarriage in particular, with at least one crawler track being arranged on each undercarriage unit.

Usually, during oscillation a movement of the two oscillating cylinders takes place relative to each other and/or relative to the chassis. In order to obtain also a simple and reliable connection between the two oscillating cylinders during this movement in particular it is of advantage for at least one of the hydraulic lines to have a flexible hose portion.

An especially simple construction is given in that all hydraulic lines provided for actuating the oscillating cylinders extend in some parts in a fixed manner along the chassis, where a hydraulic fluid supply and/or further hydraulic operating means can be provided in particular. In such case it is useful that the flexible hose portions are provided between the line portions extending on the chassis and the respective oscillating cylinders.

If a hydraulic line of an oscillating cylinder contains a hose portion, it is especially advantageous according to the invention that the safety device is arranged between the respective oscillating cylinder and the hose portion. In this embodiment consideration is given to the fact that hose portions can be damaged comparatively easily, for instance by squeezing, shearing and/or age-related porosity so that the risk of line breakage occurring on the hose portions is comparatively high. By arranging the safety device between the hose portion and the oscillating cylinder it is possible to separate the hose portion, that bears a comparatively high risk of breakage, in a simple and reliable manner from the oscillating cylinder in the event of breakage.

Preferably the hydraulic line part located between the oscillating cylinders and the respective safety device lying closest in the course of the lines is designed in a fixed manner, i.e. in an unmovable and/or encased fashion, because normally this part cannot be blocked by the safety device in the case of breakage. However, through the unmovable, encased design a particularly high passive breakage safety is given. To further increase the operational safety the hydraulic components of a safety device are suitably connected to one another in a fixed manner.

The operational safety can be enhanced further in that the remote control device has a switch, more particularly a foot switch, with the remote-control device being preferably designed such that the stop valves close when the switch is released. Hence, in the event of line breakage only one cylinder movement is possible as long as the switch is being actuated. Such a design of the remote-control device takes into account that in the case of emergency, especially when the undercarriage is tilting, it is usually instinctive to withdraw from the undercarriage and therefore from the operating elements so that the switch is released. According to the advantageous embodiment, such a release causes all stop valves to be closed automatically and therefore the cylinders to be blocked so that the undesired oscillating movement is brought to a halt. In addition, the remote-control device can be designed such that the stop valves open when the switch is pressed.

For best convenience, the switch is arranged on the driver's cabin. The remote control device can be in signal connection with the stop valves, e.g. in an electronic and/or hydraulic way. In the latter case the stop valve is suitably pilot-controlled hydraulically.

With regard to operational safety it is furthermore advantageous that the stop valve is designed such that it is closed in the signal-free state. In this embodiment a fail-safe function is provided which can ensure that the oscillation of the undercarriage is blocked in the case of an unforeseen power breakdown so that no critical oscillating state can develop.

In accordance with the invention the operational safety with regard to possible line breakage can be increased further in that at least one of the safety devices has a throttle device, which is arranged on the respective hydraulic line in order to limit a flow of hydraulic fluid from the respective oscillating cylinder. For best suitability each one of the safety devices has such a throttle device, which can be designed in particular as a flow-regulating valve. By means of such a throttle device the maximum speed of extension and/or retraction of the piston rod of the oscillating cylinder can be limited and adjusted in particular. More particularly, in the event of line breakage caused by an externally applied force it is possible by means of a throttle device to prevent the affected cylinder chamber from draining abruptly resulting in insufficient time available for blocking the stop valves.

The flow-regulating valve, which preferably constitutes the throttle device, can be designed in particular for discharge flow regulation, through which the hydraulic oil is discharged regardless of viscosity and external load. As a result, with the oscillating undercarriage according to the invention a safe operation is ensured that is largely independent of viscosity, i.e. the operating temperature of the hydraulic oil. In particular, a lower dependence on viscosity and temperature can be given here as compared to the so-called hose or pipe breakage safety devices which, on being flow-activated, only take effect on reaching a critical flow quantity.

On the throttle device a by-pass line with a check valve can be provided, which permits to pass in particular a flow of hydraulic fluid being directed to the respective oscillating cylinder. Through this e.g. the energy required during active oscillation can be reduced because the additionally supplied hydraulic fluid can bypass the throttle device via the by-pass line during active oscillation.

Moreover, according to the invention it is of advantage that for overload protection of the respective oscillating cylinder at least one of the safety devices has a pressure-limiting valve arranged on an overload line which branches off from the respective hydraulic line. As a result, the cylinder can be protected against overloads stemming from externally acting forces and therefore mechanical damage can be prevented. The pressure that is preferably set in a fixed manner on the pressure-limiting valve can in particular lie above the maximum allowable operating pressure of the cylinder and preferably amount to approximately the 1.3-fold amount of the maximum operating pressure.

For an especially reliable oscillating operation it is of advantage in accordance with the invention that the oscillating cylinders are designed as double-acting cylinders, on which two hydraulic lines are arranged in each case. To pivot the undercarriage units in opposite directions it is suitable for the hydraulic lines to be connected to each other in pairs. More particularly, each of the unidirectional chambers of the two cylinders are connected to each other via the hydraulic lines. An especially economic and constructionally simple arrangement is given in that the oscillating cylinders are differential cylinders.

If the oscillating cylinders are double-acting with two hydraulic lines each a particularly high operational safety is achieved in that a safety device is preferably provided on each of the two hydraulic lines per cylinder so that two safety devices per cylinder, that is four devices in total, are provided. For an especially economical device provision can also be made for a safety device to be provided only on one of the two lines of each double-acting cylinder, namely in particular on the line assigned to the cylinder side that bears the main part of the load. This can be the cylinder side that is subjected to compressive loads due to the weight force of the chassis. In such an embodiment only half the number of safety devices, two in all, are required.

To obtain an undercarriage that is especially good to handle and can be employed in a great variety of applications it is of advantage according to the invention that a conveyor device is provided which is connected to the hydraulic lines and by means of which hydraulic fluid can be supplied to and/or discharged from the oscillating cylinders so as to pivot the undercarriage units in the same direction. Through this an active oscillating function can be implemented. For best suitability, the conveyor device includes a hydraulic pump, by which fluid can be supplied in an alternating fashion via a 4/3-way valve either to both ring surface chambers or to both piston surface chambers of the two oscillating cylinders, and at the same time fluid can be discharged from the two opposite chambers into a discharge portion of the conveyor device.

If a conveyor device is provided it is of advantage for a particularly reliable operation that a load-holding device is provided for disconnecting a fluid connection between the conveyor device and the hydraulic lines. The load-holding device, which preferably includes at least one load-holding valve, renders it possible to block the oscillating cylinders from the oil supply needed for active oscillation. Since, during active oscillation, the two oscillating cylinders are always acted upon simultaneously and shall respond in the same way, only two operating lines are required to connect the conveyor device with the hydraulic lines of the oscillating cylinders, with one of the operating lines serving as supply line and the other as discharge line depending on the valve position of the way-valve. Due to the fact that merely two operating lines are required, in total only two load-holding valves are needed for a reliable operation of the load-holding device.

Due to the fact that according to the invention not only one single central load-holding device is provided but a plurality of additional means is made available with the safety devices, which may serve for load holding and can be arranged in particular in close proximity to the oscillating cylinders, an especially high operational safety is given in accordance with the invention. According to the invention, a stop valve can be understood in particular as a valve, with which the respective line can be blocked for both flow directions. Basically, a unilaterally blocking valve could also be sufficient.

The conveyor device and/or the load-holding device can be provided especially in a fixed manner on the chassis. More particularly, according to the invention flexible hose portions can be provided between the load-holding device and the oscillating cylinders whilst still ensuring a high operational safety, since an uncontrolled draining of fluid can be counteracted according to the invention not only by the load-holding device but also by the safety devices located close to the cylinders.

With regard to operational safety it is furthermore advantageous for the safety devices to be arranged in particular in a fixed manner on the respective oscillating cylinder. For example the safety devices can be provided on a cylinder housing of the respective oscillating cylinder. In arranging the safety devices directly on the respective oscillating cylinder the line parts between safety device and oscillating cylinder that are usually unsecured can be kept short. The safety devices can be arranged in particular in a fixed manner on the cylinder connections of the respective oscillating cylinders, whereby unsecured line portions of especially short length are given.

Furthermore, according to the invention it is advantageous that the safety devices each have a housing in which the stop valve, possibly the pressure-limiting valve and/or possibly the throttle device, are arranged. By accommodating all safety-related hydraulic elements of each safety device in one common housing respectively the susceptibility to defects is reduced and the operational safety is thereby increased further. If several safety devices are arranged on a cylinder, these can have separate housings. However, to achieve an especially compact constructional form the two safety devices of a cylinder can also have a common housing that can be connected in particular in a fixed manner to the cylinder connections.

A construction machine according to the invention is characterized in that an undercarriage according to any one of the preceding claims is provided. As a result, the advantages set out in conjunction with the undercarriage can be realized in a construction machine. The construction machine can be an earth drilling device in particular.

BRIEF DESCRIPTION OF THE SEVERAL VIEWS OF THE DRAWINGS

In the following the invention will be described in greater detail by way of preferred embodiments illustrated schematically in the drawings, wherein.

DETAILED DESCRIPTION OF THE INVENTION

Figure 1:
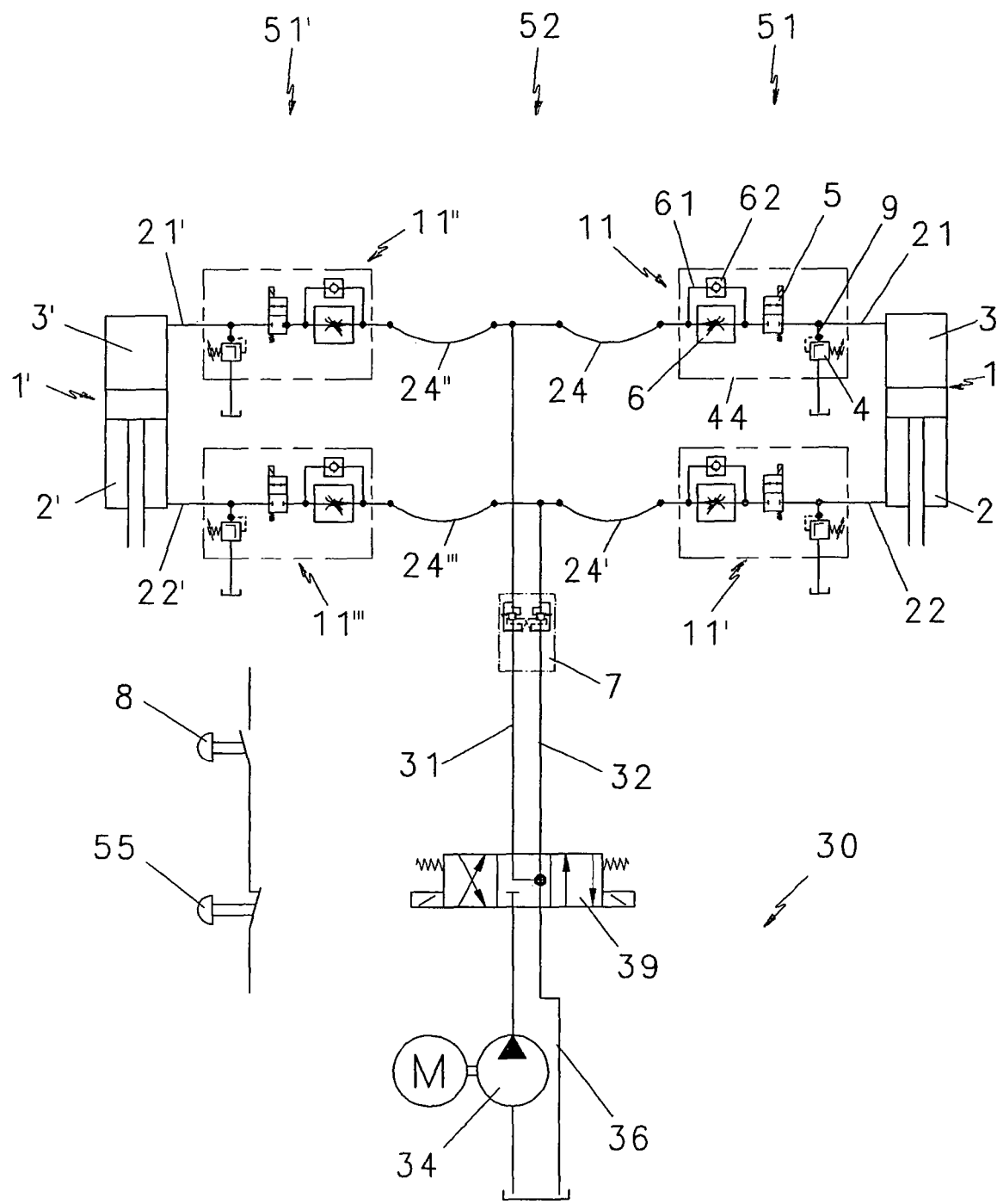
FIG. 1 shows the hydraulic layout of an oscillating device of an oscillating undercarriage according to the invention.

In FIG. 1 an oscillating device for an oscillating undercarriage according to the invention is shown. The oscillating device has two oscillating cylinders 1, 1' that serve to pivot undercarriage units 81 and respectively 81' depicted in FIGS. 2 to 4. The two oscillating cylinders 1, 1' are designed as double-acting differential cylinders. On each of the said cylinders a first hydraulic line 21 and respectively 21' is arranged, which is connected to the respective piston-head chamber 3 and respectively 3' of the cylinders 1, 1'. Furthermore, a second hydraulic line 22 and 22' is respectively arranged on each of the oscillating cylinders 1 and 1', which is connected to the respective ring surface chamber 2 and 2' respectively of the cylinders 1, 1'. The two first hydraulic lines 21 and 21' of the piston-head chambers 3, 3' are connected to each other. Likewise, the two second lines 22 and 22' of the ring surface chambers 2, 2' are connected to each other. This permits a passive counter-directed oscillating movement of the two oscillating cylinders 1, 1' such that a retraction of one of the two oscillating cylinders 1, 1' by a certain stretch leads to an extension of the second oscillating cylinder 1 or 1' by the same stretch.

The four hydraulic lines 21, 22, 21', 22' each have a flexible hose portion 24, 24', 24" and respectively 24'''. These flexible hose portions 24, 24', 24", 24''' can serve to compensate movements of the oscillating cylinders 1, 1' that occur during oscillating operation. In particular, they can serve to compensate relative movements between hydraulic line parts 51, 51' connected in a fixed manner with the oscillating cylinders 1, 1' in respect of line parts 52 connected in a fixed manner with a chassis 80.

For hose breakage protection a safety device 11, 11', 11", 11''' is each provided on the hydraulic lines 21, 22, 21', 22'. For the sake of clarity only the components of safety device 11 provided on the hydraulic line 21 are indicated by reference signs. The three remaining safety devices 11', 11", 11''' are designed in analogy.

The safety devices 11, 11"; 11', 11''', which can also be referred to as safety valve combinations, are flanged in a fixed manner on the respective oscillating cylinder 1, 1' on the side of the piston head and on the side of the piston rod, respectively. Hence, in the line course of the respective hydraulic lines 21, 22, 21', 22' the safety devices are arranged between the oscillating cylinders 1, 1' and the flexible hose portion 24, 24', 24", 24''' lying closest in each case.

The safety devices 11, 11', 11", 11''' each have a stop valve 5, which can be closed in the case of breakage of the flexible hose portion 24, 24', 24", 24''' lying closest, whereby prevention can be made of the assigned chamber 3, 2, 3' or 2' being drained unintentionally via the broken hose portion 24, 24', 24", 24'''. In the signal-free state these stop valves 5 are always blocked. They can be jointly unblocked electrically by pressing a switch 8 provided a distance apart from the safety devices 11, 11', 11", 11''' for example on a driver's cabin.

In the embodiment of FIG. 1 an emergency switch 55 is provided in addition to switch 8. When actuating the emergency switch 55 the line connection between switch 8 and the stop valves 5 is cut so that the stop valves 5 are in a signal-free state and therefore block even when switch 8 is in the pressed position.

Moreover, the safety devices 11, 11', 11", 11''' each have an overload line 9 which branches off from the respective hydraulic line 21, 22, 21', 22'. On these overload lines 9 a pressure-limiting valve 4 is arranged in each case which opens when a predetermined amount of hydraulic pressure is exceeded so that hydraulic fluid can flow out of the respective cylinder chambers 3, 2, 3', 2'. Through this the oscillating cylinders 1, 1' are protected against overloads stemming from externally acting forces. To allow for an overload protection even when the stop valve 5 is closed, the overload line 9 branches off in each case between the stop valve 5 and the closest lying oscillating cylinder 1, 1' from the respective hydraulic line 21, 22, 21', 22'.

On the side of the stop valve 5 where the line faces away from the cylinder the safety devices 11, 11', 11", 11''' each have a flow-regulating valve 6. This flow-regulating valve 6 renders it possible that the maximum flow rate of the respective assigned cylinder chamber 3, 2, 3', 2' and therefore the maximum speed of the piston rod of the oscillating cylinders 1, 1' is adjusted in the case of line breakage. As a result, it can be ensured that enough time is available in the case of line breakage in order to actuate the stop valves 5 of the safety devices 11, 11', 11", 11'''.

The flow-regulating valve 6 of each safety device 11, 11', 11", 11''' is surrounded by a by-pass line 61 in which a check valve 62 is arranged. The check valve 62 permits a fluid flow directed from the central line parts 52 to the respective assigned oscillating cylinder 1, 1' lying closest.

The safety devices 11, 11', 11", 11''' each have a common housing 44, in which the respective stop valve 5, the respective pressure-limiting valve 4, the respective flow-regulating valve 6, the respective by-pass line 61 and the respective check valve 62 are arranged.

For active oscillation the oscillating device of FIG. 1 is provided with a conveyor device 30. The conveyor device 30 is connected with the hydraulic lines 21, 21', 22, 22' via a first operating line 31, that merges into the two first hydraulic lines 21, 21' of the piston-head chambers 3, 3', and a second operating line 32, that merges into the second hydraulic lines 22, 22' of the ring surface chambers 2, 2'. The merging points are located in the line parts 52 that are connected in a fixed manner with the chassis 80.

The conveyor device 30 has a pump 34, which can be connected in an alternating manner via a way-valve 39 to the first operating line 31 or the second operating line 32, while the respective other operating line 32 or 31 respectively is connected via the way-valve 39 with a discharge line 36 of the conveyor device 30. Thus, for active oscillation the two oscillating cylinders 1, 1' can be extended or retracted in the same direction.

For example by setting the way-valve 39 in a suitable manner it is possible to convey oil from the pump 34 into the operating line 31, from where it is passed on into the piston-head chambers 3, 3'. As a consequence, oil is displaced in the ring surface chambers 2, 2' and is led via line 32 into the discharge line 36 and back into the tank. In this the two oscillating cylinders 1, 1' are extended simultaneously. The switch position of the way-valve 39 indicates if the oscillating cylinders 1, 1' extend or retract in the same direction and which of the lines 31 or 32 constitutes the supply or return line.

In order to keep the system of the two oscillating cylinders 1, 1' closed in itself during passive oscillation a load-holding device 7 is provided on the operating lines 31, 32, which has a load-holding valve for each operating line 31, 32. By means of the load-holding device 7 the hydraulic lines 21, 21', 22, 22' can be uncoupled from the external oil supply, especially from the pump 34 and the discharge line 36.

Figure 2:
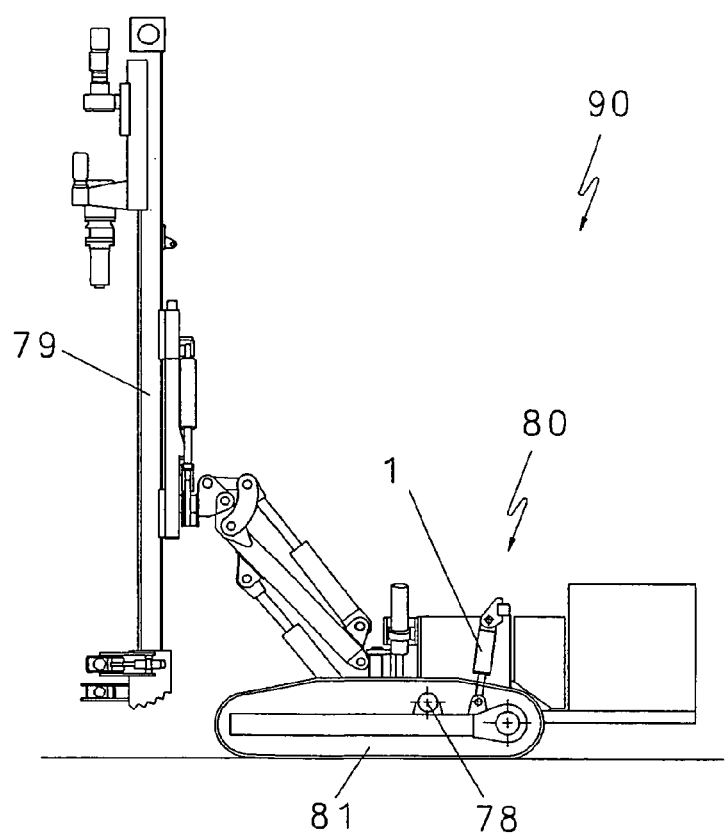
FIG. 2 shows a drilling device having an oscillating undercarriage according to the invention with the oscillating device of FIG. 1.

FIG. 2 shows a drilling device 90 having an undercarriage with an oscillating device of FIG. 1. The drilling device 90 has a chassis 80 on which a mast element 79 with a drill drive is arranged. For horizontal movement of the chasis 80 two undercarriage units 81, 81' designed as crawler-type undercarriage units are arranged thereon, in which case the second undercarriage unit 81' is concealed by the first undercarriage unit 81 in FIG. 2 and can only be seen in FIG. 4.

The two undercarriage units 81, 81' are supported in a pivotable manner on the chassis 80 about a pivot axis 78 extending transversely to the driving direction of the undercarriage units 81, 81'. For active pivoting of the two undercarriage units 81, 81' about the pivot axis 78 and consequently for carrying out an oscillating movement respective one of the two oscillating cylinders 1, 1' is articulated to the undercarriage units 81, 81', in which case the oscillating cylinders 1, 1' are articulated to the chassis 80 on their opposite side.

In the following the functioning of the oscillating device of FIG. 1 and of the safety devices 11, 11', 11", 11''' provided on the said device are described with reference to different operating modes of the drilling device 90 and its undercarriage.

Hose Breakage when Undercarriage is Stationary

When the machine is stationary the stop valves 5 of the safety devices 11, 11', 11", 11''' are without control power, in particular without current and therefore closed. Hence, a breakage of one or more flexible hose portions 24, 24', 24", 24''' does not have any effect on the oscillating cylinders 1, 1' and the drilling device 90 remains stationary.

Hose Breakage During Driving without Oscillation

If the switch 8 is not actuated during driving of the undercarriage, the stop valves 5 are without power and closed so that the two oscillating cylinders 1, 1' are separated hydraulically. Just as in the case of a stationary undercarriage the closed stop valves 5 prevent an uncontrolled movement of the device in the event of hose breakage occurring in one or more of the flexible hose portions 24, 24', 24", 24'''.

Driving onto an Obstacle with the Left Undercarriage During Passive Oscillation

If the switch 8 is actuated during movement of the drilling device 90 the stop valves 5 open and the oscillating cylinders 1, 1' are released in opposite directions. The pressure conditions present in the two oscillating cylinders 1, 1' can therefore be equalized via the lines 21, 21', 22, 22' which permits a ground adaptability of the device 90. Here the load-holding system 7 keeps the hydraulic system closed in itself.

Figure 4:
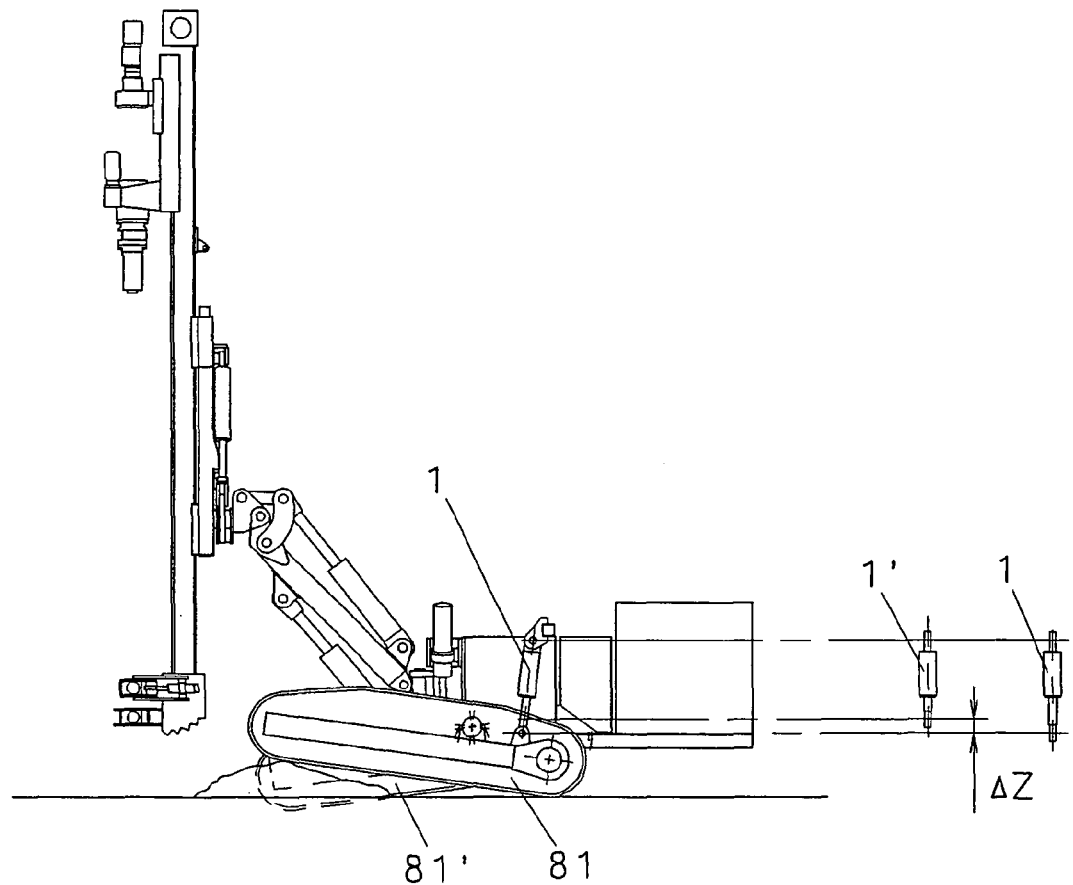
FIG. 4 shows the drilling device of FIG. 2 during passive oscillation.

As shown in FIG. 4, if the drilling device moves onto an obstacle with its left undercarriage unit for example, the piston rod of the left oscillating cylinder 1 is extended. The volume displaced thereby from the ring surface chamber 2 of the left oscillating cylinder 1 is passed into the ring surface chamber of the right oscillating cylinder 1' causing it to retract by the same amount until the same pressure conditions are present again in the two cylinders 1, 1'. On account of the fluid exchange between the cylinders 1, 1' the two oscillating cylinders 1, 1' have extension lengths that differ by the amount ΔZ. If the switch 8 is released in this position, the stop valves 5 close which causes the undercarriage to be locked in this position.

Hose Breakage During Driving and Simultaneous Passive Oscillation

In the event that one or more of the flexible hose portions 24, 24', 24", 24''' are broken during passive oscillation with opened stop valves 5, a tilting of the device is delayed to such an extent by the respective flow-regulating valve 6 that the operator of the machine is given sufficient time to release the switch 8 so that the stop valves 5 close and the oscillating undercarriage is immediately put to a standstill. Alternatively, the movement of the oscillating undercarriage can be stopped by actuating the emergency switch 55 which also leads to a closure of the stop valves 5.

Hose Breakage During Active Oscillation

For active oscillation, i.e. to be able to extend or retract both oscillating cylinders 1, 1' in the same direction, the switch 8 is actuated first. As a result, the four stop valves 5 are opened. In response, the passive oscillating automatic initially compensates unevenness of the ground on the undercarriage units 81, 81'. The compensation does not take place abruptly but, just as in passive oscillation, is slowed down through the flow-regulating valves 6.

Figure 3:
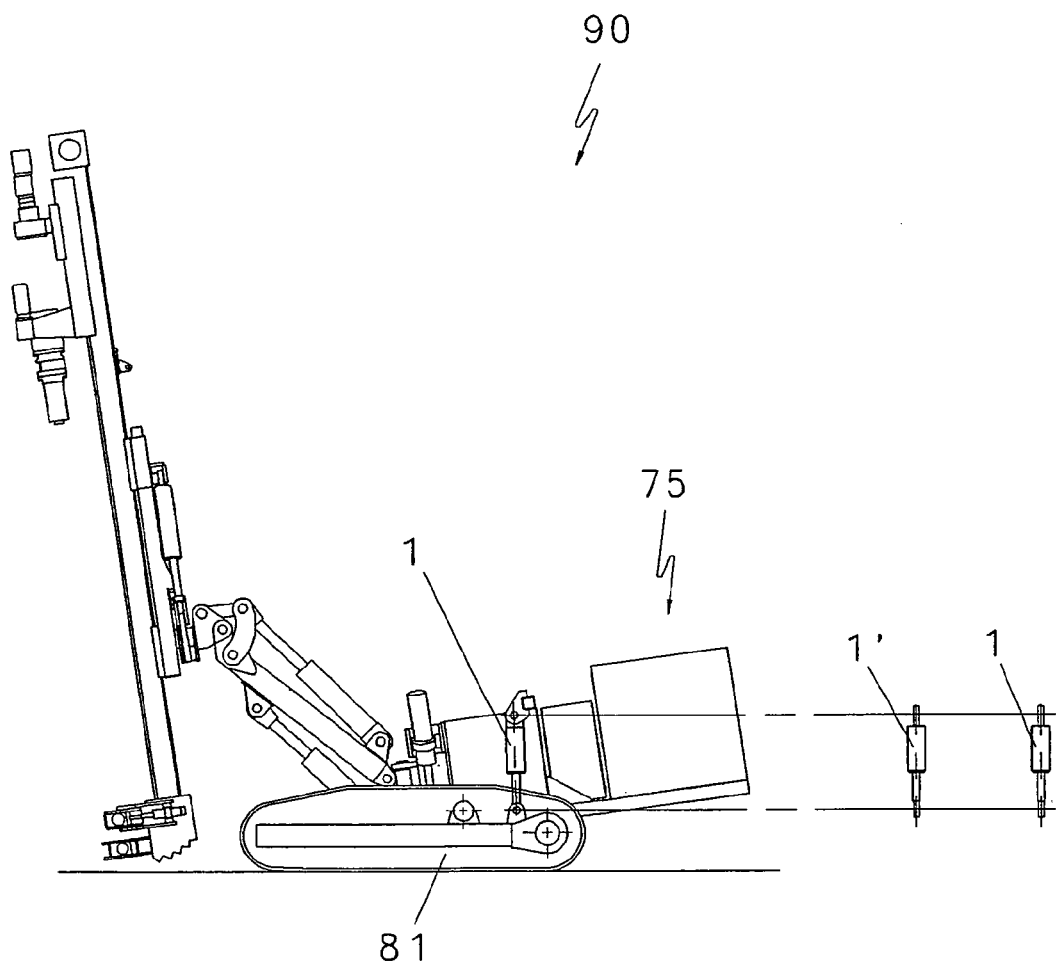
FIG. 3 shows the drilling device of FIG. 2 during active oscillation.

In the second step the way-valve 39 depicted in FIG. 1 is actuated so that e.g. oil is supplied from the pump 34 into the piston-head chambers 3, 3' and at the same time oil is discharged from the ring surface chambers 2, 2'. In doing so the two oscillating cylinders 1, 1' extend in the same direction, as shown in FIG. 3, whereby the rear 75 of the drilling device 90 is raised with respect to the ground. In the reversed switch position of the way-valve 39 the oscillating cylinders 1, 1' retract in the same direction and the rear 75 is lowered.

If a flexible hose portion 24, 24', 24", 24''' is now broken a tilting of the device 90 is delayed to such an extent by the respective flow-regulating valve 6 that the operator of the machine is able to release the switch 8 again. As a result, the undesired movement is brought to a halt immediately. Alternatively, the movement of the machine can also be stopped by actuating the emergency switch 55.

The invention claimed is:

1. An oscillating undercarriage for a drilling device, the oscillating undercarriage comprising:
   a chassis,
   two undercarriage units arranged laterally on the chassis and supported in a pivotable manner,
   two oscillating cylinders for pivoting the undercarriage units relative to the chassis, with one of the two oscillating cylinders being assigned to each undercarriage unit,
   first and second hydraulic lines arranged on each of the oscillating cylinders for actuation of the oscillating cylinders, the hydraulic lines being connected to one another for pivoting the undercarriage units in opposite directions,
   a safety device for line breakage safety provided on at least one of the first and second hydraulic lines for each oscillating cylinder, each safety device including at least one electrically remote-controlled stop valve arranged on the respective hydraulic line for blocking the respective hydraulic line in the case of breakage of the respective hydraulic line, and each safety device including a throttle device arranged on the respective hydraulic line for limiting a flow of hydraulic fluid from the respective oscillating cylinder, wherein each throttle device includes a flow regulating valve, a by-pass line, and a check valve arranged in the by-pass line to permit a flow directed towards the stop valve, and
   a remote-control device in electronic signal connection with the stop valves for opening the stop valves simultaneously during normal operation and for electronically unblocking the stop valves simultaneously.

2. The undercarriage according to claim 1, wherein at least one of the hydraulic lines has at least one flexible hose portion and the safety device is arranged between the respective oscillating cylinder and the hose portion.

3. The undercarriage according to claim 1, wherein the remote-control device has a switch, the remote-control device being such that the stop valves close when the switch is released.

4. The undercarriage of claim 3, wherein the switch comprises a foot switch.

5. The undercarriage according to claim 1, wherein the stop valve is designed such that said stop valve is closed when in a signal-free state.

6. The undercarriage according to claim 1, further comprising an overload line branching off from at least one of the first and second hydraulic lines for each of the oscillating cylinders,
wherein for overload protection of the respective oscillating cylinders at least one of the safety devices has a pressure-limiting valve arranged on each overload line.

7. The undercarriage of claim 6, wherein each of the safety devices each has a housing in which the pressure limiting valve is arranged.

8. The undercarriage according to claim 1, wherein the oscillating cylinders are double-acting cylinders, and wherein the first hydraulic lines are connected to one another and the second hydraulic lines are connected to one another in order to pivot the undercarriage units in opposite directions.

9. The undercarriage according to claim 1, further comprising:
a conveyor device, which is connected to the hydraulic lines and by means of which hydraulic fluid can be supplied to or discharged from the oscillating cylinders in order to pivot the undercarriage units in the same direction and
a load-holding device for separating a fluid connection between the conveyor device and the hydraulic lines.

10. The undercarriage according to claim 1, wherein the safety devices are arranged in a fixed manner on the respective oscillating cylinder.

11. The undercarriage of claim 1, wherein the throttle device comprises a flow regulating valve.

12. The undercarriage of claim 1, wherein each of the safety devices each has a housing in which the stop valve is arranged.

13. The undercarriage of claim 1, wherein each of the safety devices each has a housing in which the throttle device is arranged.

14. The undercarriage of claim 1, wherein the first and second hydraulic lines each have a flexible hose portion, each throttle device being arranged between the stop valve and the flexible hose portion of the respective hydraulic line.

15. A construction machine comprising
a chassis,
two undercarriage units arranged laterally on the chassis and supported in a pivotable manner,
two oscillating cylinders for pivoting the undercarriage units relative to the chassis, with one of the two oscillating cylinders being assigned to each undercarriage unit,
first and second hydraulic lines arranged on each of the oscillating cylinders for actuation of the oscillating cylinders, the hydraulic lines being connected to one another for pivoting the undercarriage units in opposite directions,
a safety device for line breakage safety provided on at least one of the first and second hydraulic lines for each oscillating cylinder, each safety device including at least one electrically remote-controlled stop valve arranged on the respective hydraulic line for blocking the respective hydraulic line in the case of breakage of the respective of the respective hydraulic line, and each safety device including a throttle device arranged on the respective hydraulic line for limiting a flow of hydraulic fluid from the respective oscillating cylinder, wherein each throttle device includes a flow regulating valve, a by-pass line, and a check valve arranged in the by-pass line to permit a flow directed towards the stop valve, and
a remote-control device in electronic signal connection with the stop valves for opening the stop valves simultaneously during normal operation and for electronically unblocking the stop valves simultaneously.

16. The construction machine of claim 15, wherein the first and second hydraulic lines each have a flexible hose portion, each throttle device being arranged between the stop valve and the flexible hose portion of the respective hydraulic line.

* * * * *